(12) United States Patent
Beam, III et al.

(10) Patent No.: US 6,179,745 B1
(45) Date of Patent: Jan. 30, 2001

(54) INDUSTRIAL TRANSMISSION

(76) Inventors: Dennis A. Beam, III, 208 Country Club Rd.; James L. Hamrick, 819 Ivywood Dr.; Hallam D. Hamrick, 803 Crawley Gin Rd., all of Shelby, NC (US) 28150; Lyle W. Reynolds, P.O. Box 2961, Shelby, NC (US) 28151

(*) Notice: Under 35 U.S.C. 154(b), the term of this patent shall be extended for 0 days.

(21) Appl. No.: 09/363,278

(22) Filed: Jul. 28, 1999

(51) Int. Cl.$^7$ .................................................. B60K 41/02
(52) U.S. Cl. ............................ 477/166; 477/168; 74/15.6
(58) Field of Search ......................... 74/11, 15.6, 15.63; 477/166, 168, 169

(56) References Cited

U.S. PATENT DOCUMENTS

| | | |
|---|---|---|
| 1,551,055 | 8/1925 | Rieseler .............................. 192/3.22 |
| 1,727,903 | 9/1929 | Rieseler . |
| 2,049,673 | 8/1936 | Starr ........................................ 180/14 |
| 2,616,534 | 11/1952 | Thurber ............................... 192/0.07 |
| 2,629,266 | 2/1953 | Thurber .................................. 74/645 |
| 2,670,823 | 3/1954 | Thurber ................................. 192/3.2 |
| 2,787,172 | 4/1957 | Gros ....................................... 74/732 |
| 3,109,524 | 11/1963 | Howard ................................. 192/3.2 |
| 3,126,079 | 3/1964 | Howard ................................. 192/3.2 |
| 3,248,969 | * 5/1966 | Gsching ................................ 74/15.6 |
| 3,253,684 | 5/1966 | Maurice ................................ 192/3.2 |
| 3,840,099 | * 10/1974 | Higuchi et al. . |
| 3,951,009 | * 4/1976 | Audifferd, Jr. et al. ............ 74/15.63 |
| 3,964,347 | 6/1976 | Ahlen ..................................... 74/733 |
| 4,805,473 | 2/1989 | Bower ................................... 74/361 |
| 4,820,209 | 4/1989 | Newman ............................... 440/74 |
| 5,199,317 | 4/1993 | Moore et al. ......................... 74/361 |
| 5,507,372 | * 4/1996 | Boardman et al. .................. 477/169 |

* cited by examiner

Primary Examiner—Sherry Estremsky
(74) Attorney, Agent, or Firm—Kilpatrick Stockton LLP; Charles W. Calkins; James J. Bindseil

(57) ABSTRACT

A transmission including a torque converter to transfer power from a driving engine to a driven device through a series of fluidly-activated clutches, particularly for use with industrial applications. By using a self-contained fluid system to engage the clutch at the idle speed of the driving engine, the transmission is provided with a positive neutral feature. The transmission is adaptable to all industrial engine housings. Additional optional features of the transmission include an auxiliary drive, a reverse and single or additional forward gears, and a fluid cooler. The transmission further includes a transmission output shaft supported by a bearing assembly that may be designed for side loading. The transmission provides the benefits of increased performance in torque demanding applications, self-lubricating features that eliminate grease fittings, load dampening, an auxiliary drive, and a throttle/clutch engagement system that eliminates clutch damage caused by improper high speed engagement.

23 Claims, 4 Drawing Sheets

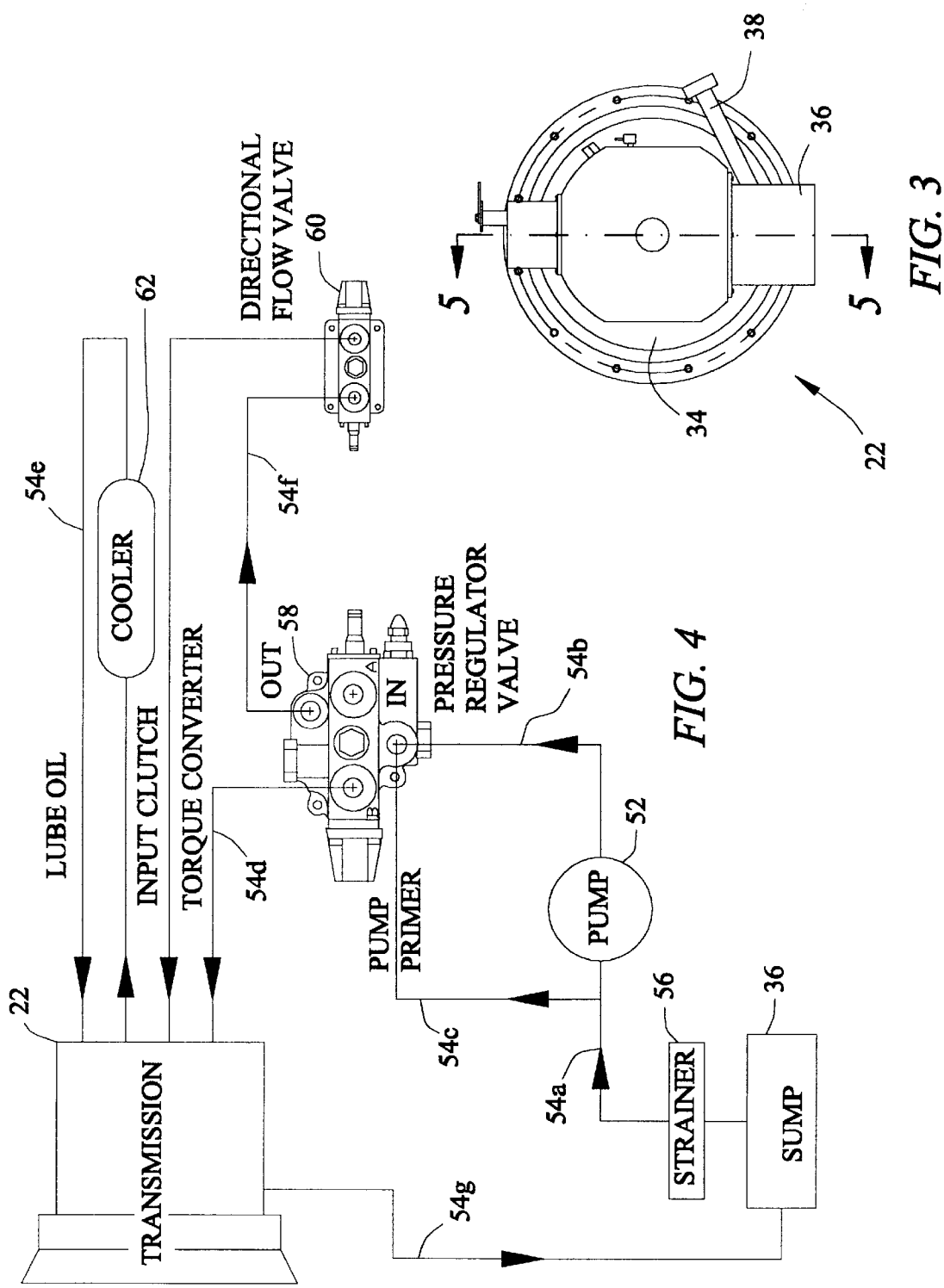

INDUSTRIAL TRANSMISSION

FIELD OF THE INVENTION

This invention relates to an industrial transmission, and in particular to a power take off fluid transmission that includes a torque converter and mechanical clutches.

BACKGROUND

Use of power take offs (PTOs) to transmit engine power to a driven component, such as wood chipper or other industrial applications, are well known in the art. Manufacturers of existing systems include Rockford Powertrains of Rockford, Ill., Twin Disc of Racine, Wis., Funk Manufacturing of Coffeyville, Kans., and Stein Manufacturing. All of the PTOs produced by these manufacturers consist of a mechanical clutch that transfers the power of the engine through an output shaft by engaging a lever that is independent of engine controls.

A number of problems result from this approach. One problem is that in many cases, the operator increases engine speed (increased revolutions per minute or RPM) during engagement of the clutch so that the driven device may be driven by the engine without stalling the engine. Such high RPM engagement of existing mechanical clutches often damages, and in some cases destroys, the clutch and other components, including engine components and driven components.

Another problem with the PTOs of the prior art arises with regard to known methods for lubrication. Currently manufactured PTOs either provide too little or too much lubrication. Too little lubrication causes parts to wear and eventually seize, resulting in unit failure. On the other hand, too much lubrication causes slippage and eventual failure. Specifically, many of the industrial transmissions of the prior art include, for example, couplings and other parts that require periodic service lubrication. Lubrication for these parts, as well as protection from external elements, is typically provided through use of grease fittings attached to rubber hoses or other covers for the parts. In addition to causing failure of the lubricated parts, failure of these fittings or covers can also result in grease from the fittings interfering with the operation of other parts of the transmission, such as clutch plates. Such interference can also result from incorrect replenishing or spillage of grease when added to the fittings. Further, manufacturers may not provide clear or sufficient maintenance instructions for lubrication, or the lubrication needs may vary widely from standard recommended lubrication because of severe loads or uses of the driven device.

Another problem with the PTOs of the prior art is that these devices typically are limited to transmitting the same amount of power that the engine delivers. Thus, for example, if the load demand of the driven component exceeds the output power of the engine, a complete and sudden shutdown of the engine will occur, and in some cases, catastrophic damage can result. Another typical result of this event is excessive machine downtime.

Further, while it is known in the art to use torque converters in industrial applications, their use is often problematic. Torque converters, such as those produced by Transfluid Industrial Transmissions of Milano, Italy, can be difficult to use in many applications because their engagement and disengagement is controlled by fluid pressure, rather than a positive or direct engagement by an operator. The engagement of these torque converters at particular fluid pressures results from a combination of RPM of the driving engine and other factors that often cannot be controlled by the operator. For example, one such factor is the viscosity of the fluid medium, which can vary widely depending on temperature. Thus, it is often difficult for an operator to accurately control the engagement and disengagement of torque converters used in industrial applications.

Another problem with existing fluid-driven transmissions is high fluid pressure, which can result in stall conditions in applications lacking a positive neutral or positive engagement/disengagement feature. For example, some prior art fluid-driven transmissions include lead plugs within the drive housing. These plugs are released if excessive fluid pressure buildup occurs, such as in the event of stall. When the plugs are released, the fluid leaks out of the plug openings and creates a maintenance and potentially an environmental hazard.

Accordingly, there is a need for a variably engageable transmission for industrial applications. There is a further need for an industrial transmission that may not be engaged at speeds other than idle. There is a further need for an industrial transmission that is self-contained, self-lubricating, and self-cleaning to maximize performance and minimize part wear. Finally, there is a need for a transmission having the capability to multiply the torque capabilities of the driving engine.

Specifically, there is a need to provide a variable engageable transmission for industrial and other applications that incorporates use of a fluidly engageable clutch assembly and a torque converter. There is an additional need to provide a variably engageable transmission that overcomes the two major problems with use of a fluid coupling, which include lack of a positive neutral and the tendency of fluid couplings to overheat upon load stalls of more than 30 seconds. There is also a need for an industrial transmission that provides for direct application of power from the engine to the driven device, without complicating gears, and that is engageable simply through a combination throttle and clutch engagement feature.

SUMMARY OF THE INVENTION

This invention is a transmission that uses a torque converter and a fluid engagement system to transfer power from a driving engine to a driven device through a series of clutches that couple the torque converter input shaft to the transmission output shaft. By using a positively controlled fluid engagement system and clutches, the transmission may be mechanically switched between neutral and positive engagement with the driving engine. Further, by utilizing the torque converter and fluidly engaged clutches, the transmission advantageously provides load/shock absorption and dampening characteristics that reduce the stress on both the driving engine and on the driven device. Further, the fluid system used to engage the clutches is also utilized for lubrication of the other components of the transmission, which are all contained within a transmission housing. The transmission housing also includes a fluid reservoir for the storage and measurement of the fluid. Additional features of the transmission include an auxiliary drive coupled to the clutches that may be utilized to power auxiliary equipment. Further, the transmission is particularly for use with industrial applications, and particularly includes bearings supporting the transmission output shaft for stressful side loading applications. Thus, the transmission provides the benefits of increased performance in torque-demanding applications, self-lubricating features which eliminate grease fittings, load dampening, an auxiliary drive, and a throttle/clutch engagement system that eliminates clutch damage caused by improper high speed engagement.

The industrial transmission housing is coupled to the driving engine typically at the flywheel housing. The shaft of the torque converter of the transmission is connected to the engine's flywheel, and the flywheel serves to convey the engine's power to the transmission. The torque converter is coupled to a clutch assembly containing the clutches. The clutch assembly is connected to the transmission output shaft that is supported by the bearings. These transmission components are contained within the housing, which supports the output shaft bearings and has features for mounting the transmission to the engine.

The torque converter and clutch assembly have a positive neutral feature, where the positive neutral feature allows engagement and disengagement of the transmission from the driving engine via a combination throttle/shift mechanism coupled to both the driving engine and the transmission. Preferably, the throttle is incrementally advanceable such that the first increment engages the transmission without accelerating the engine RPMs, thereby allowing the transmission to be engaged only at idle. The throttle/shift mechanism eliminates wear from improper engagement, and in combination with the fluid engagement of the torque converter and clutch assembly comprises a "positive neutral" feature. Further, the throttle/shift mechanism may be mounted on the housing of the driving engine or the transmission.

The throttle/shift mechanism may be connected to the engine and transmission via a pair a cables. A first cable connects the combination to the engine and a second cable connects the combination to the transmission. As such, movement of the throttle/shift mechanism moves the second cable that mechanically activates a lever on the transmission. The lever on the transmission moves a directional valve that controls hydraulic activation of the clutch assembly for engaging the torque converter and the transmission output shaft. The directional valve places the transmission between neutral and operational settings, enabling engine operation without engaging the working components of the transmission or driven device.

The torque converter connects the mechanical elements of the transmission to the engine and transfers the power of the engine to the driven output device. Further, the torque converter serves to dampen any shock loads between the driven output device and the engine. In addition, the torque converter provides the capability to multiply the torque of the engine as transmitted to the driven output device or element. A further advantage of use of the torque converter is that severe shocks or catastrophic stops of the driven device or the engine are not directly transmitted through the torque converter, and any sudden changes in RPMs of either the engine or driven element are dampened through the torque converter. Further, the torque converter is contained within the transmission housing such that a loss of fluid from the torque converter is contained within the transmission housing. Thus, the torque converter advantageously provide torque multiplication combined with features that dampen the effect of excessive loads and prevent complete and sudden shutdowns, as well as limit catastrophic failures and downtime.

The torque converter drives a hydraulic pump that circulates the fluid through the fluid system. Functions of the hydraulic pump include: 1) filling the torque converter with fluid; 2) directing fluid to appropriate locations to lubricate all of the internal components of the transmission; 3) directing fluid to a directional valve that controls the clutches of the transmission; 4) circulating fluid to a cooler and back to the reservoir; and 5) filtering the fluid through an internal filter and one or more additional filters located throughout the transmission. An adjustable or fixed pressure regulator controls the pressure of the fluid within the system. Also, the cooler or radiator included as part of the fluid system continues to cool the fluid even during stall conditions.

The clutch assembly includes pressure, friction and drive plates that are engaged and disengaged by use of a directional valve within the fluid system. Engagement and disengagement of the plates in turn transfers and disengages power from the torque converter to the transmission output shaft. Preferably, the clutch assembly is specially designed to contain heavy pressure, friction and drive plates for industrial applications.

Additionally, the clutch assembly includes a spline coupling that engages a spline on the transmission output shaft. When the clutch assembly is engaged, the transmission output shaft becomes locked to the torque converter shaft. Further, the clutch plates may include notches or splines at their outside edges for engaging corresponding notches or splines on a clutch housing. Further, the clutch assembly includes an inner hub that extends through the middle of the clutch plates and through openings in hub engaging plates. The hub engaging plates have notches or splines in the openings that engage corresponding notches or splines on the inner hub. When the clutch is engaged, the clutch plates frictionally engage the engaging plates. Additionally, the clutch housing may include external lugs, splines or gear teeth that drive an auxiliary device, such as a shaft or hydraulic pump. Thus, through these splines, the transmission output shaft is engageable through the clutch assembly to the torque converter.

The transmission is a self-contained unit that uses a fluid as a medium for operation and the fluid also serves as a cleaner and lubricant for the components of the transmission. Thus, the fluid itself is a functional part of the unit and the transmission allows for exact measurement and use of the fluid in all appropriate locations. Also, the fluid by its nature has cleaning properties that further protect the internal parts of the transmission.

BRIEF DESCRIPTION THE FIGURES

FIG. 3 is an end view of the industrial transmission of FIG. 2;

FIG. 4 is a block diagram of the hydraulic components and hydraulic flow of the industrial transmission of FIG. 2.

DETAILED DESCRIPTION

Figure 1:
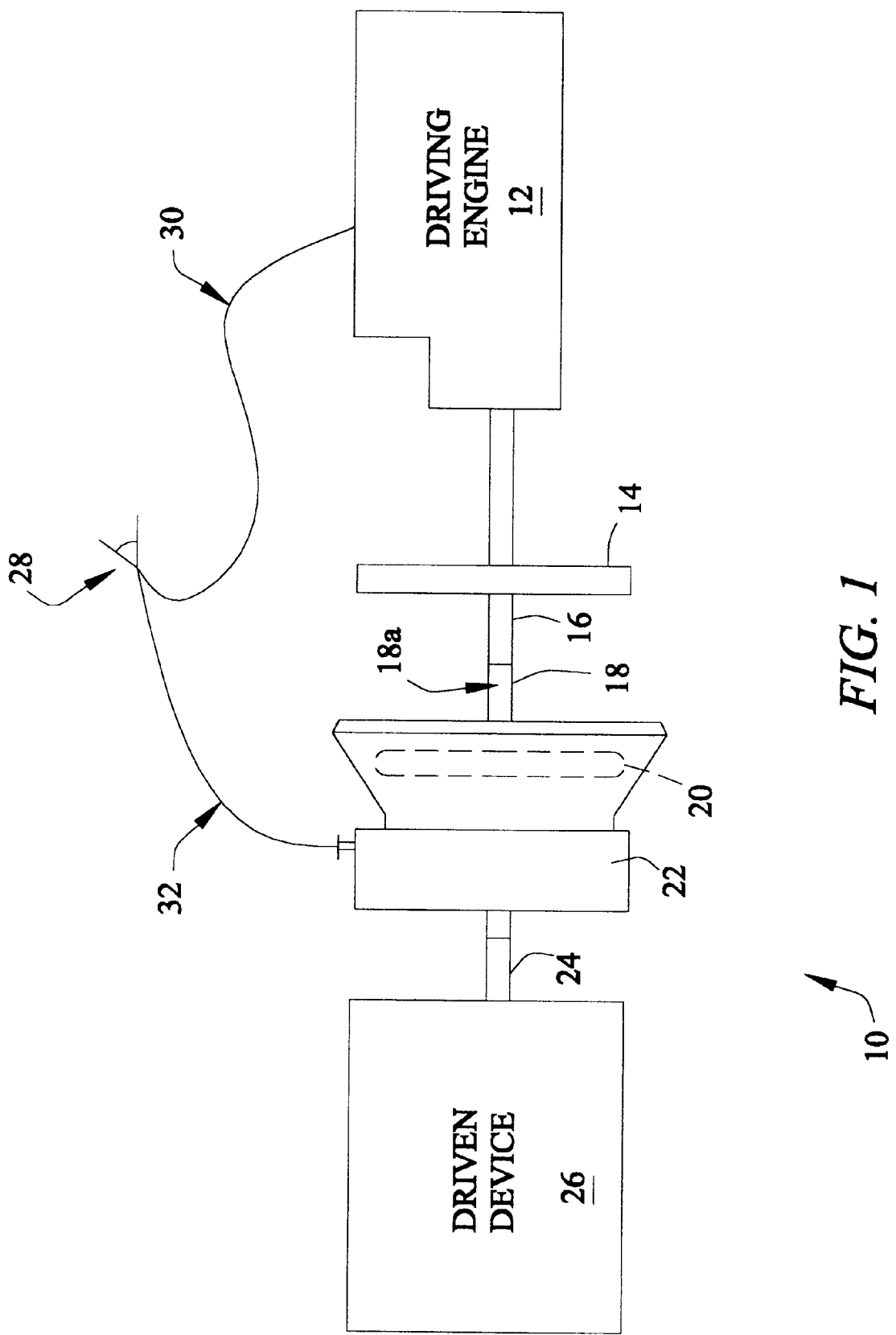
FIG. 1 is a schematic view of one embodiment the industrial transmission of the present invention for use with an engine and a driven device.

Referring to FIG. 1, one embodiment of a transmission system 10 for use in industrial applications includes a driving engine 12 having a flywheel 14 and an engine output shaft 16 that is connected to a torque input end 18a of a shaft 18 forming part of a torque converter 20 of a transmission 22. Extending from the transmission 22 is transmission output shaft 24, which drives a driven device 26, such as a wood chipper, leaf vacuum or other industrial device. Preferably, transmission 22 is for stationary applications.

The engine 12 speed and engagement of the transmission 22 is controlled by a variable controller 28, such as a pivoting throttle/clutch lever/cable combination or other similar mechanism. The variable controller 28 is connected to the driving engine 12 through a first coupler 30, for example a cable, that serves as a throttle control for the engine. Additionally, the variable controller 28 is connected to the industrial transmission 22 through a second coupler 32, for example a cable or control linkage, that serves as an engagement mechanism for the transmission.

The variable controller 28 has an initial (engine idle) position in which the transmission 22 is not engaged (positive neutral), a first incremental position in which the transmission is engaged, and additional positions in which the engine speed may be accelerated while the transmission is engaged. The first position of engagement of the transmission 22 is via mechanical movement of a valve within the transmission, which in turn engages a clutch to fluidly couple the torque converter 20 through the transmission to the transmission output shaft 24.

Figure 2:
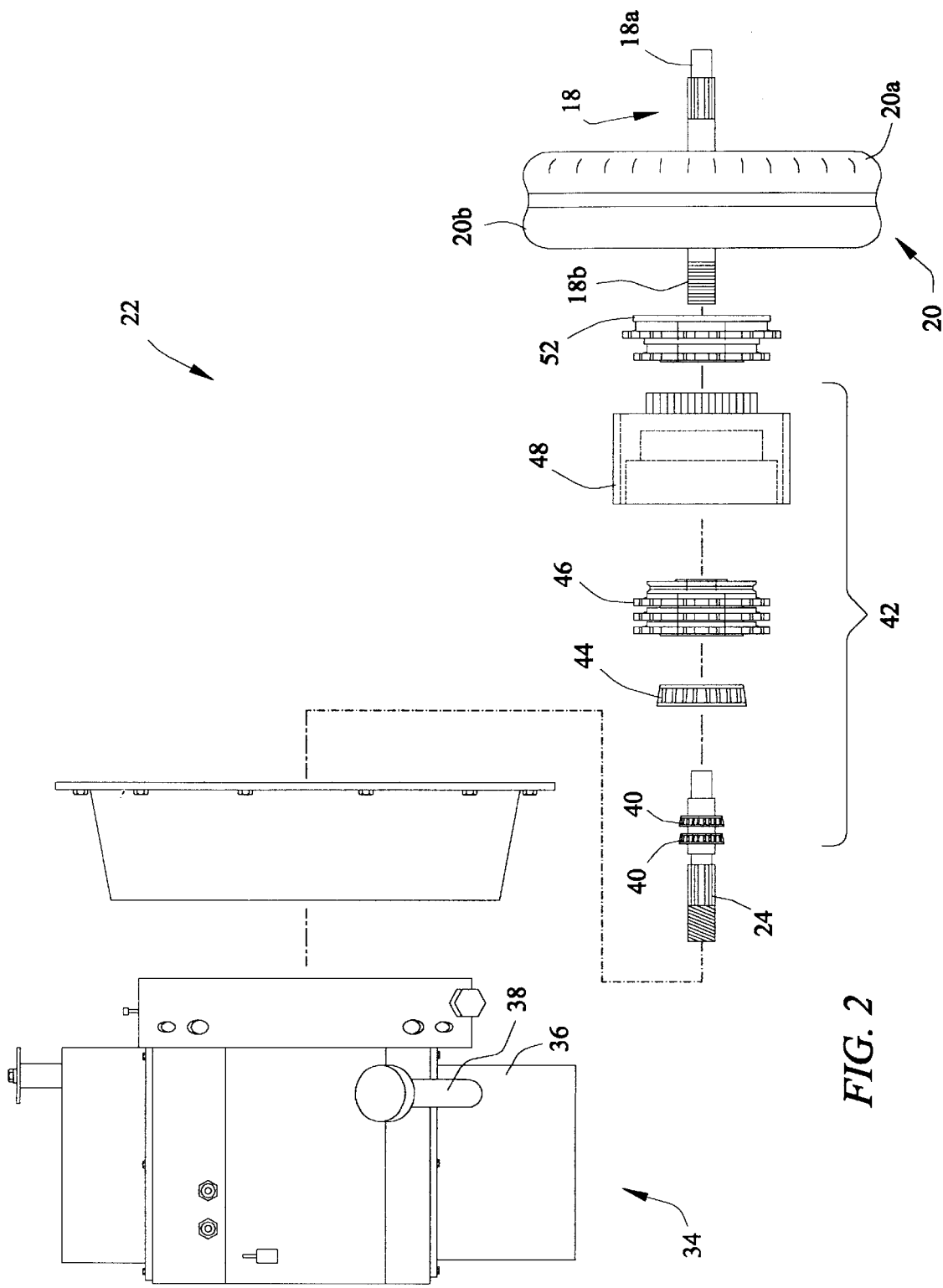
FIG. 2 is an exploded view of the components of the industrial transmission of FIG. 1.

Referring to FIGS. 2 and 3, the transmission 22 includes a transmission housing 34 with a sump 36 providing a chamber for storage of fluid 37 (FIG. 5) and further including a fill opening/dipstick 38 for replenishing and measuring fluid levels. The transmission 22 also includes the transmission output shaft 24 having a shaft support member 40, such as thrust or side load ball bearings. Further, the transmission 22 includes a clutch assembly 42 having a clutch hub 44 interacting with a clutch pack 46 adapted to be coupled with a clutch housing 48. The clutch assembly 42 is coupled to a torque output end 18b of the shaft 18 of the torque converter 20. The torque converter 20 further includes an impeller side 20a and a turbine side 20b, and a shaft 18 that is connectable to, for example, the engine output shaft 16 (see FIG. 1). Optionally, a hydraulic pump 52 or other similar auxiliary power source may be coupled to torque output end 18b of shaft 18 to drive auxiliary devices. The hydraulic pump 52 or other auxiliary power source may include an auxiliary shaft supported by auxiliary shaft bearings that are lubricated by the fluid 37.

In operation, driving engine 12 (FIG. 1) is coupled to transmission 22 through torque input end 18a of shaft 18. The rotational energy of the driving engine 12 may be multiplied by the torque converter 20 and transferred through torque output end 18b of shaft 18 to transmission output shaft 24 through clutch assembly 42. The transmission 22 has an overall gear ratio, where the gear ratio is a ratio of the rotation of input shaft 18 to the rotation of output shaft 24. Preferably, the overall gear ratio is about 1:1, although the overall gear ratio may be varied to suit each particular application. Additionally, the optional hydraulic pump 52 also may utilize the rotational energy of the shaft 18 to drive auxiliary components. Thus, the power of the driving engine 12 is multiplied and transferred through the transmission 22 to the transmission output shaft 24 to smoothly power the driven device 26 (FIG. 1).

The industrial transmission 22 includes a positive neutral feature that only engages the transmission when the driving engine 12 is idling. In operation, referring to FIGS. 4 and 5, the coupling of the driving engine 12 to the industrial transmission 22 through the torque converter 20 causes a fluid flow through the industrial transmission 22 without engaging clutch assembly 42. In effect, the fluid is flowing through a bypass circuit until redirected to engage the clutch.

With the start of rotation of the driving engine 12, the engine rotation is transferred through the torque converter 20 to the torque output end 18b of shaft 18 which turns the hydraulic pump 52. The hydraulic pump 52 initiates a fluid flow 54a from the sump 36, where it is drawn through a strainer 56 such as a filter. The fluid is drawn through the hydraulic pump 52 and flows 54b to a pressure regulator valve 58. Pressure regulator valve 58 insures that the fluid pressure throughout the industrial transmission fluid system is maintained at an appropriate pressure to operate the transmission and compensates for wear in the pump. Also, another flow 54c, between the strainer 56 and pressure regulator valve 58, is provided for pump priming. In this bypass circuit, the fluid continues to flow 54d from the pressure regulator valve 22 through the torque converter 20 and through the transmission 22 and finally flows 54g to the sump 36. Additionally, the present invention preferably includes a fluid flow 54e from the transmission 22 to a cooler 24 (FIG. 4), such as a radiator or fan, for cooling the fluid. Cooler 24 insures that the fluid is maintained at a desired operating temperature.

When the throttle/clutch variable controller 28 (FIG. 1) is moved to the first position, the transmission 22 is engaged through second coupler 32, such as a cable/lever combination, that changes the position of directional flow valve 60. Directional control valve 60 is connected in parallel to the fluid flow system within the industrial transmission, and is preferably mounted within the housing 34. And hydraulic flow 20d occurs from the pressure regulator valve 22 to the directional flow valve 23. The change of position of the directional flow valve 60 initiates another flow 54f of fluid to clutch assembly 42, thereby causing the compression of clutch and friction plates that lock together and engage transmission output shaft 24. As such, the power from driving engine 12 is multiplied by the torque converter 20 and transferred to the transmission output shaft 24 by the clutch assembly 42. Increased power and torque is then transferred by further incrementing the variable controller 28, which adjusts the throttle to increase the speed of the driving engine 12. The transmission output shaft 24 is then disengaged by incrementing the variable controller 28 back to the idle or neutral position, which changes the position of the direction flow valve 60 to cut off the fluid flow 54f to the clutch assembly 42.

Figure 5:
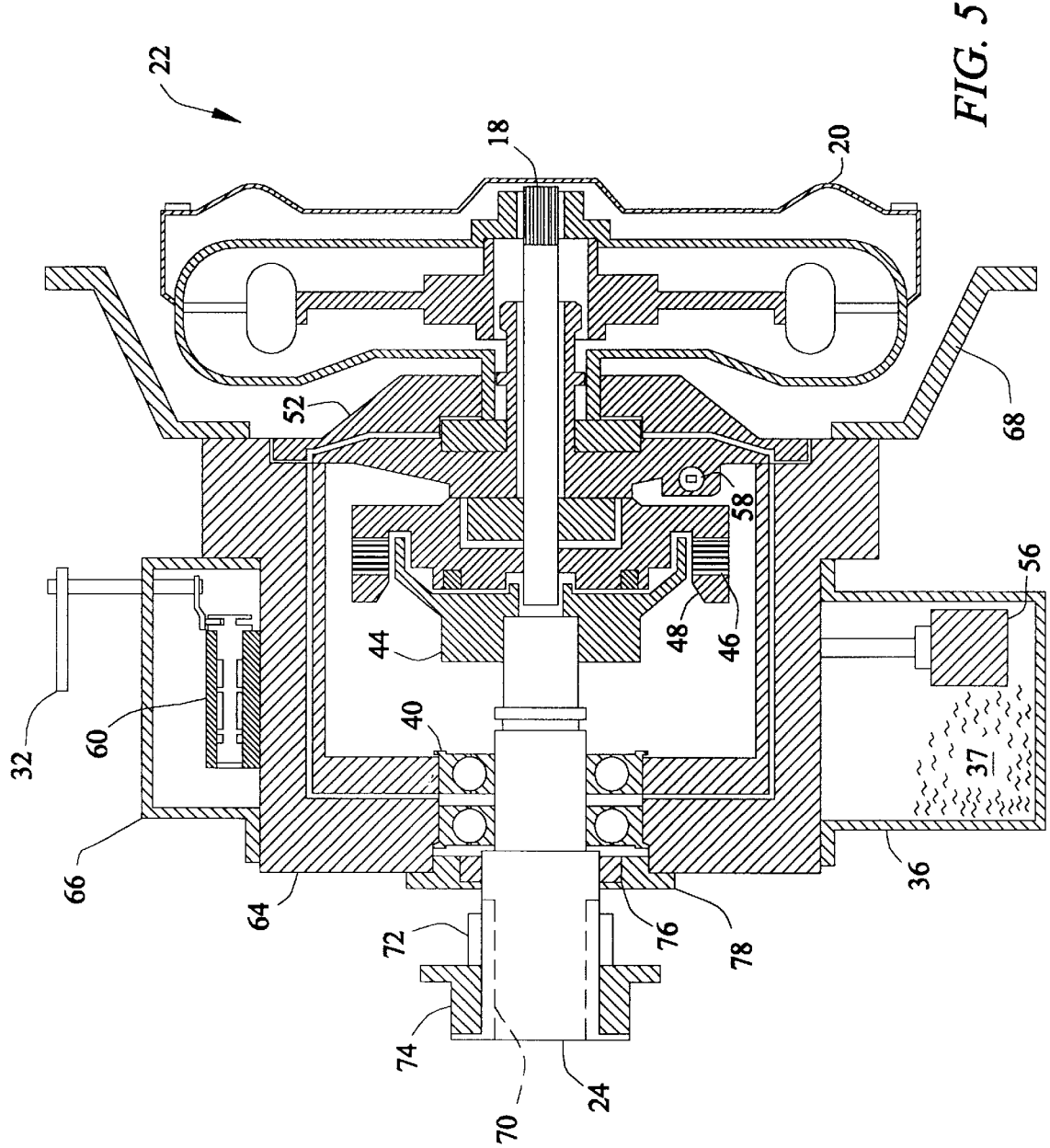
FIG. 5 is a cross-sectional view of the industrial transmission of FIG. 3.

Additionally, referring to FIG. 5, the transmission housing 34 further includes a case 64 having a top cover 66 that forms a chamber that houses the directional flow valve 60. Attached to the case 64 at one end is a bell housing 68 that houses the torque converter 20 and attaches to the driving engine 12. The bell housing 68 sealingly mounts the transmission 22 to the driving engine 12 so as to contain the fluid 37 within the housing 34. The bell housing 68 may include an adapter plate for mounting the transmission 22 to the driving engine 12. For example, the bell housing 68 may include a Society of Automotive Engineers mounting in sizes 1 to 5. Also, the transmission output shaft 24 may include a keyway 70 for holding a key 72 to secure a bushing or pulley 74, for example, to the transmission output shaft. The transmission output shaft 24 is rotatably supported within the case 64 by shaft support member 40, such as a bearing assembly. Additionally, an output shaft seal 76 and a seal retainer 78 are fitted between the case 64 and the transmission output shaft 24 to seal the fluid 37 within the housing 34.

The directional flow valve of FIG. 5 has a clutch-engaging position and a neutral position. Other directional valves may be used that have additional positions, for example, to enable a reverse drive of the transmission output shaft 24.

Similarly, the clutch assembly 42 may include additional plates and gears to enable variable speed drive and reverse drive.

Although the industrial transmission has been described and illustrated in detail, it is to be clearly understood that the same is intended by way of illustration and example only and is not to be taken by way of limitation. For example, the transmission may be provided with a reverse gear or additional forward gears. The housing may comprise aluminum, steel, iron and other similar materials that may be machined, cast and otherwise formed with known manufacturing techniques. Also, the hydraulic pump may include a gear, vane, rotor, and piston pump or other similar pump. Further, the number and size of the clutch plates may vary depending on the horsepower rating of the drive engine. These plates may be available as off the shelf parts or specially manufactured for use with particular industrial applications of the transmission. Also, the shift lever may be engaged via a button on the throttle lever, the button being engageable only at engine idle speed. The auxiliary drive may be adapted for driving an external driven device that may be mounted to the housing of the industrial transmission. For example, a hydraulic pump may operate via the auxiliary drive to power a feed system, conveyor, lift arm, a lift cylinder on a wood chipper, or to provide hydraulic pressure to serve other purposes, or simply to turn an additional shaft, such as to operate a second wood chipper. Accordingly, variations and modifications of the industrial transmission will be apparent to one skilled in the art and the following claims are intended to cover all such modifications and equivalents.

What is claimed is:

1. A transmission for transferring power from a driving engine, comprising:
    an output shaft;
    a torque converter having a torque input end and a torque output end, said torque input end adapted for coupling with said driving engine;
    a fluidly engageable clutch assembly adapted to couple said output shaft and said torque converter;
    a fluid flow system for fluidly engaging said clutch assembly and for lubricating said transmission; and
    a directional flow valve coupled to said fluid system and said clutch assembly, said directional flow valve having at least a first and a second position, said first and second positions respectively causing disengagement and engagement between said clutch assembly and said torque converter, and wherein said second position is achieved at an idle speed of said driving engine.

2. A transmission as recited in claim 1, wherein said transmission is self-contained.

3. A transmission as recited in claim 2, wherein said transmission further comprises a housing containing said transmission, said housing adapted for sealingly mounting to said driving engine.

4. A transmission as recited in claim 1, further comprising a throttle/clutch mechanism adapted for simultaneously controlling the speed of said driving engine and the engagement of said clutch assembly.

5. A transmission as recited in claim 1, wherein said clutch assembly and said torque converter are adapted to absorb and dampen shock loads transferred through said output shaft.

6. A transmission for transferring power from a driving engine, comprising:
    an output shaft;
    a torque converter having a torque input end and a torque output end, said torque input end adapted for coupling with said driving engine;
    a fluidly engageable clutch assembly adapted to couple said output shaft and said torque converter;
    a fluid flow system for fluidly engaging said clutch assembly and for lubricating said transmission;
    a directional flow valve coupled to said fluid system and said clutch assembly, said directional flow valve having at least a first and a second position, said first and second positions respectively causing disengagement and engagement between said clutch assembly and said torque converter; and
    a throttle/clutch mechanism adapted for simultaneously controlling the speed of said driving engine and the engagement of said clutch assembly, wherein adjustment of said throttle/clutch mechanism moves said directional flow valve from said first position to said second position, and wherein adjustment of said throttle/clutch mechanism to move said directional flow valve into said second position is achieved at an idle speed of said driving engine.

7. A transmission as recited in claim 6, wherein said clutch assembly and said torque converter are adapted to absorb and dampen shock loads transferred through said output shaft.

8. A transmission as recited in claim 6, wherein said transmission is self-contained.

9. A transmission as recited in claim 8, wherein said transmission further comprises a housing containing said transmission, said housing adapted for sealingly mounting to said driving engine.

10. A transmission as recited in claim 6, further comprising an auxiliary drive coupled to said output shaft.

11. A transmission driveable by a rotating driving shaft, comprising:
    an input shaft coupleable to said rotating driving shaft;
    a hydraulic pump for pumping a transmission fluid such that said transmission fluid has a hydraulic pressure;
    a torque converter having a turbine side and an impeller side, said turbine side being attached to said input shaft, and said torque converter being fillable by said transmission fluid such that said transmission fluid serves as a medium for hydraulically coupling said turbine side and said impeller side;
    a clutch assembly coupled to said torque converter, wherein said clutch assembly is engageable by said hydraulic pressure of said hydraulic fluid;
    an output shaft engageable with said clutch assembly such that the rotation of said rotating driving shaft is transferable through said torque converter to said output shaft via said clutch assembly, wherein said output shaft has an output shaft rotation;
    a hydraulic flow and pressure control unit, wherein said control unit controls the filling of said torque converter with said transmission fluid, and wherein said control unit controls the engagement of said clutch assembly via at least one valve; and
    a variable controller for selectively engaging said clutch assembly via said at least one valve; and
    wherein said rotating driving shaft is driven by a driving engine having a speed control device, and wherein said variable controller is connected to said speed control device such that said clutch assembly is selectively engageable by said speed control device.

12. The transmission of claim 11, wherein said variable controller comprises a cable.

13. The transmission of claim 11, wherein said at least one valve is mechanically activated by said variable controller.

14. The transmission of claim 11, wherein said speed control device comprises a throttle, and wherein said variable controller comprises a mechanical controller, such that said clutch assembly is selectively engageable by movement of said throttle.

15. The transmission of claim 14, wherein said driving engine operates at a plurality of speeds, wherein said plurality of speeds include an idle speed, and wherein said clutch assembly is only engageable at said idle speed.

16. The transmission of claim 14, further comprising a housing for containing said transmission and mounting said transmission to said driving engine.

17. The transmission of claim 11, further comprising an auxiliary drive coupled to said output shaft.

18. The transmission of claim 17, wherein said auxiliary drive comprises at least one auxiliary shaft and at least one auxiliary shaft bearing.

19. The transmission of claim 18, wherein said at least one auxiliary shaft bearing is lubricated by said transmission fluid.

20. The transmission of claim 11, wherein said transmission is for stationary applications.

21. The transmission of claim 11, further comprising a radiator for cooling said transmission fluid.

22. The transmission of claim 11, wherein said torque converter is capable of multiplying the torque of said rotating driving shaft.

23. The transmission of claim 11, wherein said transmission fluid is a lubricant for said transmission.

* * * * *